Figure 1:
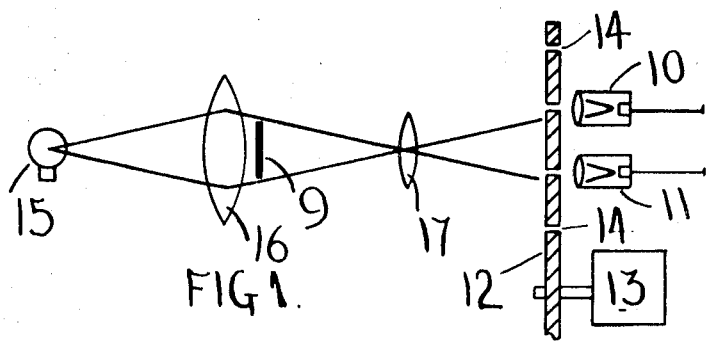

United States Patent

[11] 3,620,629

| [72] | Inventor | Keith R. Whittington |
| | | Shelford, Cambridge, England |
| [21] | Appl. No. | 828,454 |
| [22] | Filed | May 26, 1969 |
| [45] | Patented | Nov. 16, 1971 |
| [73] | Assignee | T. I. (Group Services) Limited |
| | | Birmingham, England |
| [32] | Priority | June 12, 1968 |
| [33] | | Great Britain |
| [31] | | 27,885/68 |

[54] OPTICAL GAUGES
2 Claims, 6 Drawing Figs.

[52] U.S. Cl..................................................... 356/160,
250/219 WD, 356/156
[51] Int. Cl....................................................... G01b 11/04
[50] Field of Search........................................ 250/219
WD, 219 LG; 356/160, 167, 168, 156, 158, 159

[56] References Cited
UNITED STATES PATENTS

| 3,254,226 | 5/1966 | Bobula et al................. | 356/167 |
| 3,448,278 | 6/1969 | O'Brien et al................ | 250/219 WD |
| 3,475,611 | 10/1969 | Kitchener..................... | 250/219 WD |

FOREIGN PATENTS

| 894,573 | 1962 | Great Britain................ | 356/160 |
| 1,115,950 | 6/1968 | Great Britain................ | 250/219 WD |

OTHER REFERENCES

Dehmel et al., " Automated Tape Width Measurement," IBM Technical Disclosure Bulletin, Vol. 8, No. 2, Jul. 1965, pp. 274- 275

Primary Examiner—Ronald L. Wibert
Assistant Examiner—J. Rothenberg
Attorney—Holman & Stern ABSTRACT: An optical gauge for determining the width of an object and including a rotary disc having apertures equiangularly spaced about the rotary axis of the disc and spaced a nominal distance apart, a pair of light-sensitive devices disposed on one side of the disc and spaced said nominal distance apart, and means for projecting an image of the object upon the side of the disc remote from the light-sensitive devices, the arrangement being that the signals from the light-sensitive devices can provide an indication of when the image of the object is larger or smaller than said nominal distance.

OPTICAL GAUGES

This invention relates to optical gauges for determining the width of an object and has for its purpose to provide such a gauge in a simple and convenient form.

An optical gauge in accordance with the invention comprises in combination, a pair of light-sensitive devices spaced a nominal distance apart and disposed in a plane substantially parallel to a plane containing the object the width of which is to be measured, a scanning device including a member movable in a plane substantially parallel to said planes, the member having a plurality of apertures formed therein, said apertures being spaced apart by a distance equal to said nominal distance and arranged to obscure and expose said light-sensitive devices as the member moves, to an image of said object and means responsive to the electrical output of said light-sensitive devices for providing an indication of when the size of said image which is indicative of the width of said object, is equal to or deviates from said nominal distance.

Figure 4:
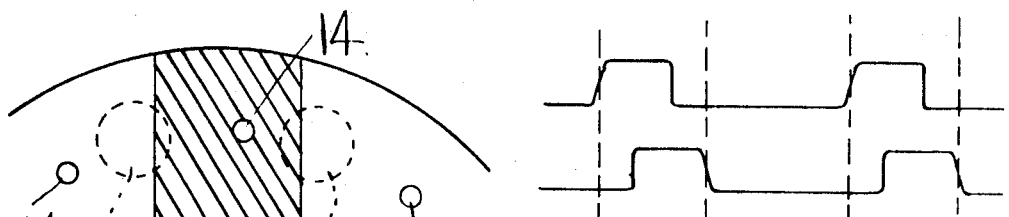
Figure 5:
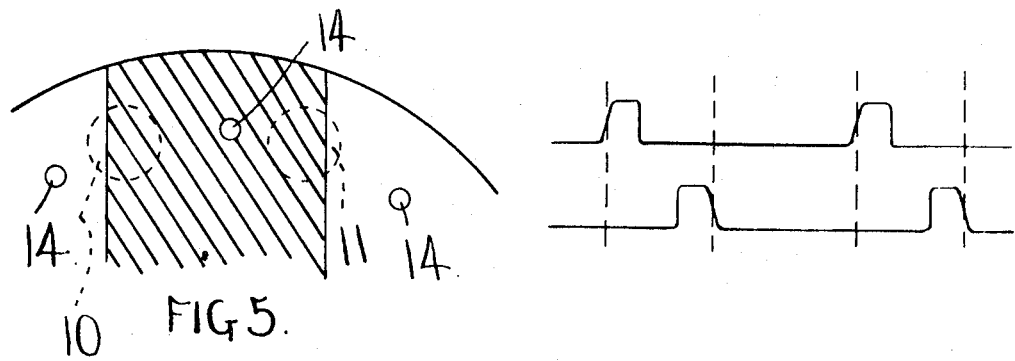
Figure 6:
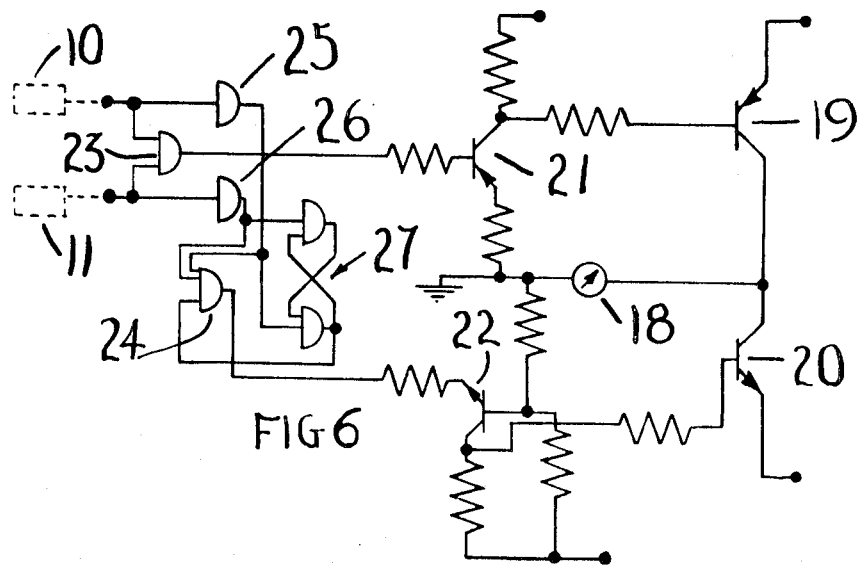

One example of a gauge in accordance with the invention will now be described with reference to the accompanying drawings in which:

FIG. 1 is a diagrammatic view of one form of the gauge,

FIGS. 2, 3, 4, and 5 show views looking in the direction of the disc under various conditions and also show the electrical outputs from the light-sensitive devices under these conditions, and FIG. 6 shows a circuit diagram of the logic network and output stages.

The gauge shown in the drawings has been devised to enable measurements to be made of the diameter of a tube without actually touching the tube but it is equally useful for measuring the width of an article for instance strip material.

The gauge comprises a pair of light-sensitive devices in the form of photoelectric sensors 10, 11 the axes of which are spaced apart by a nominal distance in side-by-side relationship. Also provided is a scanning device which includes a movable member in the form of a disc 12 which is driven by means of an electric motor 13. The scanning disc is provided with a plurality of apertures 14 which are equiangularly spaced about the axis of the disc and at equal distances therefrom. The spacing of the apertures is equal to the aforesaid nominal distance.

The gauge also includes a projection unit which is provided with a light source 15 and a condenser lens 16. The projection unit illuminates through an object lens 17, the side of the disc 12 remote from the sensors and when the tube or object 9 to be measured is positioned intermediate the lens 16 and the lens 17 an image of the object is cast upon the disc. The image is in fact a shadow of the object and the size of the shadow will depend upon the magnification. In the case of a flat object, the object must be disposed normal to the optical axis of the projector unit so that the size of the shadow is truly representative of the width of the object to be measured. In the case of a round tube this does not matter. The optical axis of the projector unit is normal to the plane of the disc 12 and the photoelectric sensors are disposed in a plane parallel to the plane of the disc.

Figure 2:
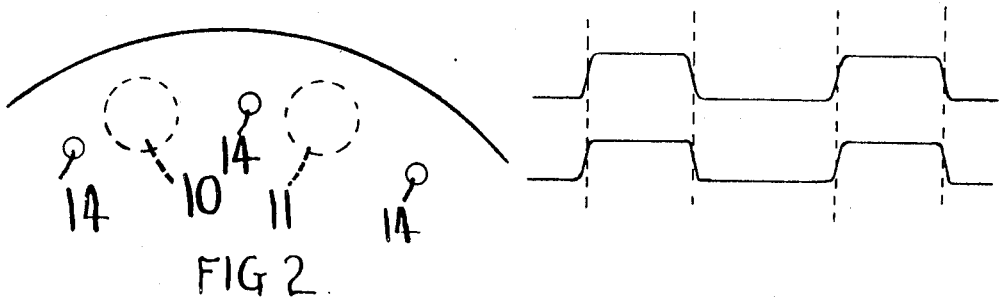
Figure 3:
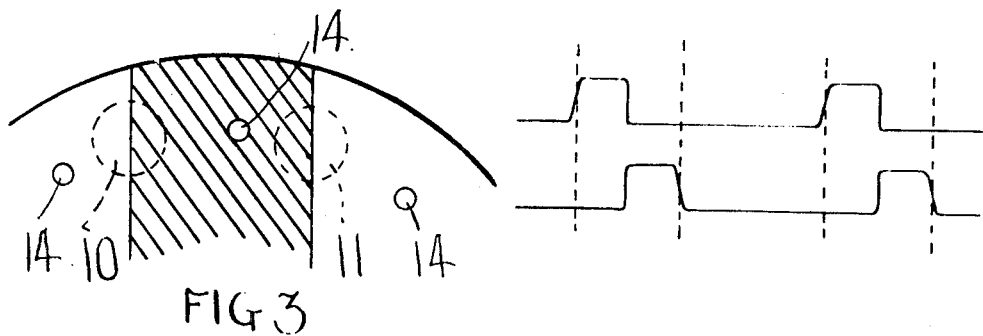

Turning now to FIG. 2, this shows the situation when no object is present. The whole of the surface of the disc is illuminated by the light projector and as the disc rotates the two sensors will be exposed to the light at the same time and for the same period. Thus the electrical outputs will be in phase and of generally square waveform. In FIG. 3 the image or shadow of the object is exactly equal to the aforesaid nominal distance so that the inner halves of the fields of view of the sensors in the absence of the disc, would be in the shadow. Owing to the disc however which rotates in the clockwise direction as seen in FIG. 2, sensor 10 is first exposed by an aperture 14 and produces an electrical output until the edge of the shadow is reached but during this time sensor 11 is exposed by an aperture 14 to the shadow so that no electrical output is obtained. During continued angular movement of the disc, sensor 11 produces an electrical output whereas no electrical output is obtained from sensor 10. The two electrical outputs are therefore exactly out of phase.

FIGS. 4 and 5 show the electrical outputs obtained when the shadow is smaller and larger than the aforesaid nominal distance respectively. When the shadow is smaller, overlapping of the electrical signals is obtained but when the shadow is larger there is a time interval between the signals. The extent of overlap or of the time interval for small variations from the nominal distance is proportional to the amount by which the image or shadow is under or over size. Furthermore, it is independent of the lateral position of the object providing the image of shadow is within the field of view of the sensors.

In order to present the electrical signals in an understandable form such for instance as reading on a center zero measuring instrument 18, a complementary pair of transistors 19, 20 are provided which in the absence of drive signals are biased off so that no current flows in the meter. Transistors 21, 22 acting as buffer stages are provided and when a drive signal is applied to one of the transistors 19, 20 current flow occurs in one direction through the meter and when a drive signal is applied to the other transistor current flow occurs in the other direction. The drive signal for said transistor 19 is obtained from a simple NAND-gate 23 which is supplied with the electrical outputs from the two sensors 10, 11. Thus, when both sensors are producing an electrical signal a pulse is applied to transistor 19 and the needle of the meter 18 moves in said one direction. The mean value of the current flow in the meter is proportional to the length of the overlap of the electrical signals and therefore to the amount by which the image or shadow is smaller than said nominal distance.

The drive signal for the transistor 20 is obtained from a further NAND-gate 24 having three inputs. Two of these inputs are negative inverted signals from the sensors 10,11 produced by inverters 25, 26 while the other input is derived from a bistable circuit 27 which produces a positive signal which starts when the sensor 10 produces an electrical signal and finishes with the end of the signal or the start of the signal from the sensor 11 whichever is the later. The pulse from the NAND-gate 24 is only present when the image or shadow is larger than the predetermined distance.

The size of the shadow depends upon the magnification imparted by the projector unit so that by varying the magnification the gauge can be used to measure any width within fairly wide limits.

In some instances and when the article is red hot the light source and condenser lens 16 can be dispensed with; furthermore, providing the sensors are sufficiently sensitive the light source and condenser lens can be replaced by a diffuse illuminating screen mounted on the opposite side of the object 9 from the disc 12.

Having thus described my invention what I claim as new and desire to secure by Letters Patent is:

1. An optical gauge for determining a dimension of an object by a method wherein an image of the object which image includes the dimension to be measured is projected on one side of a selectively apertured rotary disc, and the dimension of the image is sensed through apertures in the disc by a pair of light-sensitive devices arranged on the side of the disc other than said one side, comprising: a rotary disc including motor means to rotate the disc; means to project an image of the object onto one side of the disc; a pair of photoelectric sensors arranged in a plane parallel to the disc plane on the side of the disc opposite to the side receiving the object-image and spaced a nominal distance apart; a plurality of equiangularly arranged apertures on said disc spaced apart by a distance equal to said nominal distance; means responsive to an electrical output of said photoelectric sensors including a complementary pair of first and second transistors; a center zero measuring instrument through which current flows in opposite directions when the transistors are conducting respectively; a first NAND gate to which signals from said photoelectric sensors are applied and which when the two signals are present at the same time indicative of the measured dimension of the image being smaller than said nominal distance, produces a signal which switches the first of said transistor on; a second NAND gate to which negative inverted signals from said photoelectric sensors are applied together with a third signal; and a bistable circuit producing said third signal, said third signal being a positive signal which starts when one of said sensors produces a signal and finishes with whichever is the later of the end of said one sensor's signal or the start of a signal from the other of said sensors, said second NAND gate producing a signal to cause conduction of the second transistor only when the dimension measured of the image is larger than said nominal distance.

2. The optical gauge as in claim 1 which includes a source of light and condenser-lens means disposed on the remote side of the object from the disc.

* * * * *